US012768171B2

(12) United States Patent
Bande et al.

(10) Patent No.: US 12,768,171 B2
(45) Date of Patent: Oct. 20, 2026

(54) STRUCTURE FOR PROVIDING SHADE ONTO A SURFACE AND A METHOD FOR ASSEMBLING THE SAME

(71) Applicant: United Arab Emirates University, Al Ain (AE)

(72) Inventors: Lindita Bande, Al Ain (AE); Waleed Ahmed, Al Ain (AE); Anwar Ahmad, Al Ain (AE)

(73) Assignee: UNITED ARAB EMIRATES UNIVERSITY, Al-Ain (AE)

(*) Notice: Subject to any disclaimer, the term of this patent is extended or adjusted under 35 U.S.C. 154(b) by 0 days.

(21) Appl. No.: 19/179,157

(22) Filed: Apr. 15, 2025

(65) Prior Publication Data

US 2026/0318081 A1 Oct. 15, 2026

(51) Int. Cl.
*E04F 10/08* (2006.01)
*B33Y 80/00* (2015.01)

(52) U.S. Cl.
CPC .............. *E04F 10/08* (2013.01); *B33Y 80/00* (2014.12)

(58) Field of Classification Search
CPC ......... B33Y 80/00; H02S 20/10; H02S 20/26; H02S 20/30
USPC .................................... 52/64, 86, 87, 88, 89
See application file for complete search history.

(56) References Cited

U.S. PATENT DOCUMENTS 2,278,797 A * 4/1942 Raymond ................ E04C 3/40 52/89
2,693,195 A * 11/1954 Frieder .................. E04H 15/18 52/63
3,924,368 A * 12/1975 Pedersen .................. E04C 3/40 52/643
4,208,846 A * 6/1980 Griebel .................. E04F 10/08 D25/57
4,259,819 A * 4/1981 Wemyss ................ E04H 15/322 52/273
4,685,829 A * 8/1987 Matiere ..................... F16L 9/22 405/149
6,026,613 A * 2/2000 Quiring ..................... E04C 3/40 52/63
6,085,468 A * 7/2000 Quiring ..................... E04C 3/08 52/273

(Continued)

Primary Examiner — James J Buckle, Jr.
(74) *Attorney, Agent, or Firm* — MH2 Technology Law Group, LLP

(57) ABSTRACT

A structure for providing shade onto a surface is disclosed. The structure comprising a segmented frame comprising a plurality of modular segments being configured to be connected to form the structure. The plurality of modular segments comprising a support frame comprising at least one of an arc-shaped elongated body and at least one of a platform. The support frame being constructed through an additive manufacturing process. The support frame comprising a plurality of prefabricated mounting recesses. A lattice structure comprising a plurality of movable panels. The lattice structure being supported and secured to the support frame through the plurality of prefabricated mounting recesses. A method for assembling the structure is also disclosed, which includes providing the support frame constructed through additive manufacturing process. The method further includes securing the lattice structure with a plurality of movable panels to the support frame through the prefabricated mounting recesses to form the structure.

19 Claims, 15 Drawing Sheets

(56) References Cited

U.S. PATENT DOCUMENTS

| | | | | |
|---|---|---|---|---|
| 6,240,694 | B1 * | 6/2001 | Castano | E04B 1/3211 52/654.1 |
| 6,243,994 | B1 * | 6/2001 | Bernini | E02D 29/045 405/126 |
| 6,571,851 | B1 * | 6/2003 | Jelic | E06B 9/262 160/90 |
| 8,479,463 | B2 * | 7/2013 | Gee | F24S 23/74 136/246 |
| 9,957,719 | B2 * | 5/2018 | Wiborg | E04F 10/08 |
| 10,560,050 | B2 * | 2/2020 | Raghunathan | H02S 20/30 |

* cited by examiner (a) (b) (c)

STRUCTURE FOR PROVIDING SHADE ONTO A SURFACE AND A METHOD FOR ASSEMBLING THE SAME

TECHNOLOGICAL FIELD

The present disclosure in general relates to the field of structural engineering. The present disclosure is further directed towards a structure for providing shade onto a surface and a method for assembling the same.

BACKGROUND

The information in this section merely provides background information related to the present disclosure and may not constitute prior art(s) for the present disclosure.

Shading structures play a crucial role in architectural, urban, and industrial applications by providing protection from solar radiation, wind, and precipitation. These structures help reduce indoor temperatures, minimize glare, and improve energy efficiency, particularly in buildings located in regions with extreme climatic conditions. Conventional shading systems are typically fabricated using metal, wood, or composite materials and often incorporate fixed or manually adjustable panels to regulate sunlight and heat. However, these conventional configurations pose several challenges, such as high production costs, labor-intensive installation, and limited adaptability to dynamic environmental conditions.

Recent advancements in additive manufacturing (AM), also known as three-dimensional (3D) printing, have introduced new possibilities for fabricating lightweight, structurally optimized, and customizable shading structures. Unlike conventional fabrication methods, additive manufacturing enables precise material deposition, allowing for complex geometries, seamless integration of functional components, and on-demand production. Additionally, AM also enhance the structural integrity, thermal performance, and longevity of shading structures while minimizing their weight.

Despite these advancements, shading systems have yet to fully leverage the potential of additive manufacturing. Many conventional shading configurations still rely on standardized components that lack the flexibility required for customized, site-specific applications. Additionally, large-scale shading systems often face material stability issues, complex installation requirements, and high maintenance demands, reducing their overall efficiency and lifespan. The growing emphasis on energy efficiency and climate-responsive architecture has further increased the demand for shading systems that can dynamically respond to environmental conditions. Kinetic shading mechanisms are dynamic, adaptive shading systems that can adjust in real-time to regulate light and heat entry, improving thermal comfort, reducing energy consumption, and enhancing daylighting. They achieve this through the movement of structure elements, such as folding louvers, rotating fins, or sliding panels, controlled by sensors and actuators. While the kinetic shading mechanisms have been introduced, they often depend on mechanical assemblies that add the complexity, cost, and maintenance requirements.

Consequently, additive manufacturing presents an opportunity to redefine shading systems by enabling customized, adaptive, and structurally efficient solutions. As urban development continues to accelerate and the demand for sustainable, high-performance architectural elements increases, there is a pressing need for an innovative shading system that combines adaptability, efficiency, and ease of integration into modern and retrofitted structures.

Present disclosure is directed to overcome one or more limitations stated above or any other limitations associated with the known arts.

General Description

One or more shortcomings of the prior art are overcome by a device and a method as claimed and additional advantages are provided through the present disclosure. Additional features and advantages are realized through the techniques of the present disclosure. Other embodiments, implementations and aspects of the disclosure are described in detail herein and are considered a part of the claimed disclosure.

A first aspect of the disclosure concerns a structure for providing shade onto a surface, the structure comprising a segmented frame comprising a plurality of modular segments being configured to be connected to form the structure. The plurality of modular segments comprising a support frame comprising at least one of an arc-shaped elongated body and at least one of a platform. The support frame being constructed through an additive manufacturing process, the support frame comprising a plurality of prefabricated mounting recesses and a lattice structure comprising a plurality of movable panels. The lattice structure being supported and secured to the support frame through the plurality of prefabricated mounting recesses wherein, thickness and density of the support frame being varied along the length of the support frame during the additive manufacturing process.

According to a configuration of the first aspect, the additive manufacturing process employs at least one of gradient density infill technique, or a variable layer thickness optimization technique.

According to a configuration of the first aspect, the plurality of modular segments are connected by mechanical fasteners.

According to a configuration of the first aspect, a reinforcement embedded within the arc-shaped elongated body of the support frame during the additive manufacturing process.

According to a configuration of the first aspect, the plurality of movable panels is connected through an interlocking joint mechanism and is adapted to be pivotable or rotatable to regulate environmental inputs including solar radiation and airflow control.

According to a configuration of the first aspect, the reinforcement comprises at least one of continuous fiber reinforcement, embedded metal components, or composite reinforcement layers.

According to a configuration of the first aspect, the structure is constructed through a material selected from UV-resistant polymers, composite materials, or cementitious composites.

According to a configuration of the first aspect, the plurality of movable panels includes at least one photovoltaic panel.

According to a configuration of the first aspect, the structure comprises a plurality of actuators operatively connected to the plurality of movable panels within the lattice structure.

According to a configuration of the first aspect, the prefabricated mounting recesses are configured to accommodate a plurality of structural elements of the structure.

A second aspect of the disclosure concerns a method for assembling a structure for providing shade onto a surface. The method comprising providing a support frame comprising at least one of an arc-shaped elongated body and at least one of a platform. The support frame being constructed through an additive manufacturing process, the support frame comprising a plurality of prefabricated mounting recesses, wherein thickness and density of the support frame being varied along the length of the support frame during the additive manufacturing process and securing a lattice structure comprising a plurality of movable panels to the support frame through prefabricated mounting recesses to form the structure.

According to a configuration of the second aspect, the additive manufacturing process employs at least one of gradient density infill technique, or a variable layer thickness optimization technique.

According to a configuration of the second aspect, the support frame is constructed by a hybrid material extrusion process selected from fused deposition modeling (FDM), stereolithography (SLA), or concrete extrusion.

According to a configuration of the second aspect, applying a hydrophobic or UV-resistant coating to the support frame.

According to a configuration of the second aspect, the lattice structure is connected by a fastening mechanism selected from mechanical interlocks, snap-fit connections, or adhesive bonding.

A third aspect of the disclosure concerns a system for providing shade onto a surface. The system comprising a plurality of structures connectable to each other, wherein one or more of the plurality of structures comprising a segmented frame comprising a plurality of modular segments being configured to be connected to form the structure. The plurality of modular segments comprising a support frame comprising at least one of an arc-shaped elongated body and at least one of a platform, the support frame being constructed through an additive manufacturing process. The support frame comprising a plurality of prefabricated mounting recesses, a lattice structure comprising a plurality of movable panels. The lattice structure being supported and secured to the support frame through the plurality of prefabricated mounting recesses, wherein thickness and density of the support frame being varied along the length of the support frame during the additive manufacturing process.

According to a configuration of the third aspect, the additive manufacturing process employs at least one of gradient density infill technique, or a variable layer thickness optimization technique.

According to a configuration of the third aspect, the segmented frame is adapted for retrofitting onto existing buildings.

According to a configuration of the third aspect, the plurality of movable panels is connected through an interlocking joint mechanism and is adapted to be pivotable or rotatable to regulate the environmental inputs including solar radiation and airflow control.

EMBODIMENTS

The present disclosure also encompasses embodiments as defined in the following numbered phrases. It should be noted that these numbered embodiments intended to add to this disclosure and is not intended in any way to be limiting.

1. A structure for providing shade onto a surface, the structure comprising: a segmented frame comprising a plurality of modular segments being configured to be connected to form the structure, the plurality of modular segments comprising: a support frame comprising at least one of an arc-shaped elongated body and at least one of a platform, the support frame being constructed through an additive manufacturing process, the support frame comprising a plurality of prefabricated mounting recesses; and a lattice structure comprising a plurality of movable panels, the lattice structure being supported and secured to the support frame through the plurality of prefabricated mounting recesses; wherein, thickness and density of the support frame being varied along the length of the support frame during the additive manufacturing process.
2. The structure of embodiment 1, wherein the additive manufacturing process employs at least one of gradient density infill technique, or a variable layer thickness optimization technique.
3. The structure of embodiment 1, wherein the plurality of modular segments are connected by mechanical fasteners.
4. The structure of embodiment 1, comprises a reinforcement embedded within the arc-shaped elongated body of the support frame during the additive manufacturing process.
5. The structure of embodiment 1, wherein the plurality of movable panels is connected through an interlocking joint mechanism and is adapted to be pivotable or rotatable to regulate environmental inputs including solar radiation and airflow control.
6. The structure of embodiment 1, wherein the reinforcement comprises at least one of: continuous fiber reinforcement, embedded metal components, or composite reinforcement layers.
7. The structure of embodiment 1, wherein the structure is constructed through a material selected from UV-resistant polymers, composite materials, or cementitious composites.
8. The structure of embodiment 1, wherein the plurality of movable panels includes at least one photovoltaic panel.
9. The structure of embodiment 1, comprises a plurality of actuators operatively connected to the plurality of movable panels within the lattice structure.
10. The structure of embodiment 1, wherein the prefabricated mounting recesses are configured to accommodate a plurality of structural elements of the structure.
11. A method for assembling a structure for providing shade onto a surface, the method comprising: providing a support frame comprising at least one of an arc-shaped elongated body and at least one of a platform, the support frame being constructed through an additive manufacturing process, the support frame comprising a plurality of prefabricated mounting recesses, wherein thickness and density of the support frame being varied along the length of the support frame during the additive manufacturing process; and securing a lattice structure comprising a plurality of movable panels to the support frame through prefabricated mounting recesses to form the structure.
12. The method of embodiment 11, wherein the additive manufacturing process employs at least one of gradient density infill technique, or a variable layer thickness optimization technique.
13. The method of embodiment 11, wherein the support frame is constructed by a hybrid material extrusion process selected from fused deposition modeling (FDM), stereolithography (SLA), or concrete extrusion.

14. The method of embodiment 11, comprising applying a hydrophobic or UV-resistant coating to the support frame.
15. The method of embodiment 11, wherein the lattice structure is connected by a fastening mechanism selected from mechanical interlocks, snap-fit connections, or adhesive bonding.
16. A system for providing shade onto a surface, the system comprising: a plurality of structures connectable to each other, wherein one or more of the plurality of structures comprising: a segmented frame comprising a plurality of modular segments being configured to be connected to form the structure, the plurality of modular segments comprising: a support frame comprising at least one of an arc-shaped elongated body and at least one of a platform, the support frame being constructed through an additive manufacturing process, the support frame comprising a plurality of prefabricated mounting recesses; a lattice structure comprising a plurality of movable panels, the lattice structure being supported and secured to the support frame through the plurality of prefabricated mounting recesses; wherein thickness and density of the support frame being varied along the length of the support frame during the additive manufacturing process.
17. The system of embodiment 16, wherein the additive manufacturing process employs at least one of gradient density infill technique, or a variable layer thickness optimization technique.
18. The system of embodiment 16, wherein the segmented frame is adapted for retrofitting onto existing buildings.
19. The system of embodiment 16, wherein the plurality of movable panels is connected through an interlocking joint mechanism and is adapted to be pivotable or rotatable to regulate the environmental inputs including solar radiation and airflow control.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

Figure 1:
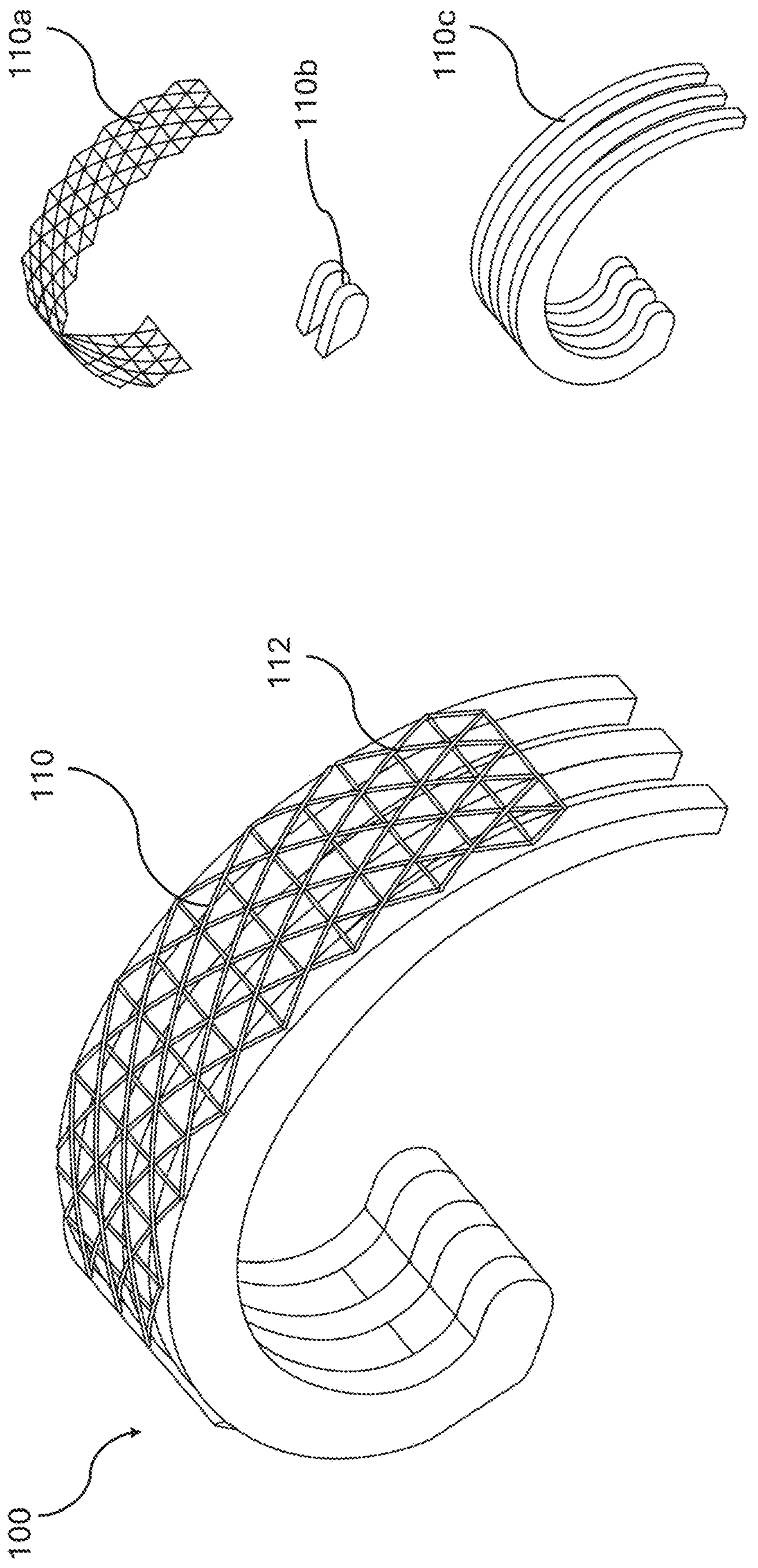
FIG. 1 illustrates an assembled view and an exploded view of a structure comprising a support frame and a lattice structure, according to an example of the present disclosure.
Figure 2:
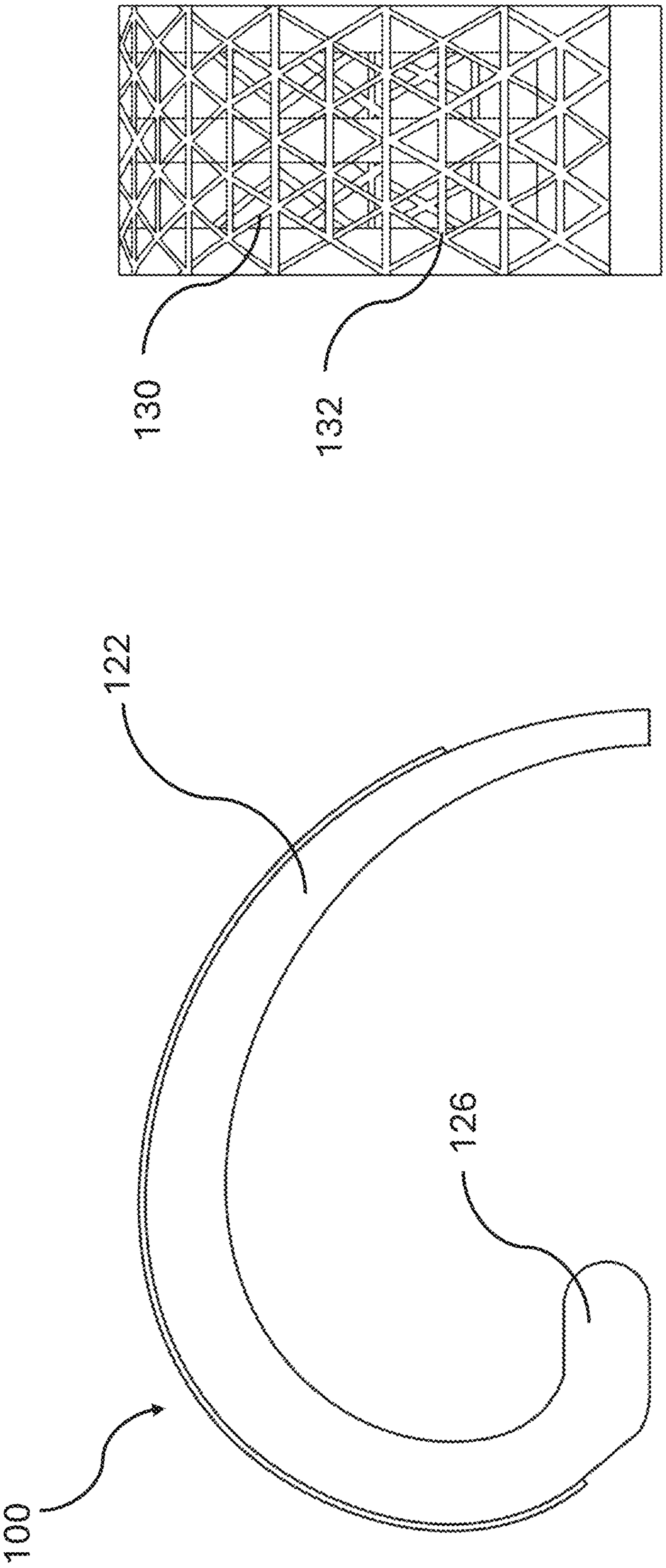
FIG. 2 illustrates a side view and a front view of the structure, in accordance with an example of the present disclosure.

The present disclosure relates to a structure 100 [also referred to as 'shade structure 100' hereinafter in the present disclosure], in accordance with an exemplary implementation of the present disclosure. Referring to FIG. 1 and FIG. 2, the structure 100 is configured to provide shade onto a surface while incorporating functional adaptability and environmental responsiveness. The structure 100 comprises a segmented frame 110 comprising a plurality of modular segments 110*a*, 110*b*, 110*c*. In one implementation, the plurality of modular segments 110*a*, 110*b*, 110*c* are configured to be connected to form the structure 100. In one implementation, the plurality of modular segments 110*a*, 110*b*, 110*c* are adapted to be assembled using mechanical fasteners 112. In one implementation, the mechanical fasteners 112 include screws, bolts, or quick-locking mechanisms to facilitate rapid assembly and disassembly of the structure 100. The modular nature of the segmented frame 110 allows for scalability and customization, enabling configurations suitable for different spatial constraints and applications.

In one implementation, the plurality of modular segments 110*a*, 110*b*, 110*c* of the segmented frame 110 comprises a support frame 120 and a lattice structure 130. The support frame 120 comprises an arc-shaped elongated body 122, which serves as the primary load-bearing component, providing structural integrity and stability. The arc-shaped geometry of the elongated body 122 allows for even distribution of loads, reducing stress concentrations and enhancing overall strength. Its curved design enables it to efficiently bear both compressive and tensile forces, making it a robust structural element. Additionally, the multi-layered or ribbed structure of the elongated body 122 increases rigidity while maintaining a lightweight form. This structural configuration is particularly advantageous in applications requiring high strength-to-weight ratios, such as in bridges, mechanical frameworks, aerospace structures, and robotic assemblies. Overall, the arc-shaped elongated body 122 plays a crucial role in the support frame 120, ensuring mechanical stability, efficient load-bearing capabilities, and long-term durability. Additionally, the support frame 120 comprises at least one platform 126. The support frame 120 is constructed through an additive manufacturing process, allowing for the precise creation of complex geometries while minimizing material waste and enabling modular construction.

Referring to FIG. 2, the lattice structure 130 comprises a plurality of interconnected members 132 arranged in a geometric pattern to enhance the overall rigidity and strength of the lattice structure 130. The plurality of interconnected members 132 distribute loads efficiently across the structure 100, reducing stress concentrations and improving weight distribution. The configuration not only provides additional reinforcement to the support frame 120 but also reduces the overall weight of the structure 100 without compromising its durability. The modular nature of the segmented frame 110 allows for ease of assembly and scalability, making it adaptable for various applications in architecture, infrastructure, or industrial design.

Figure 3:
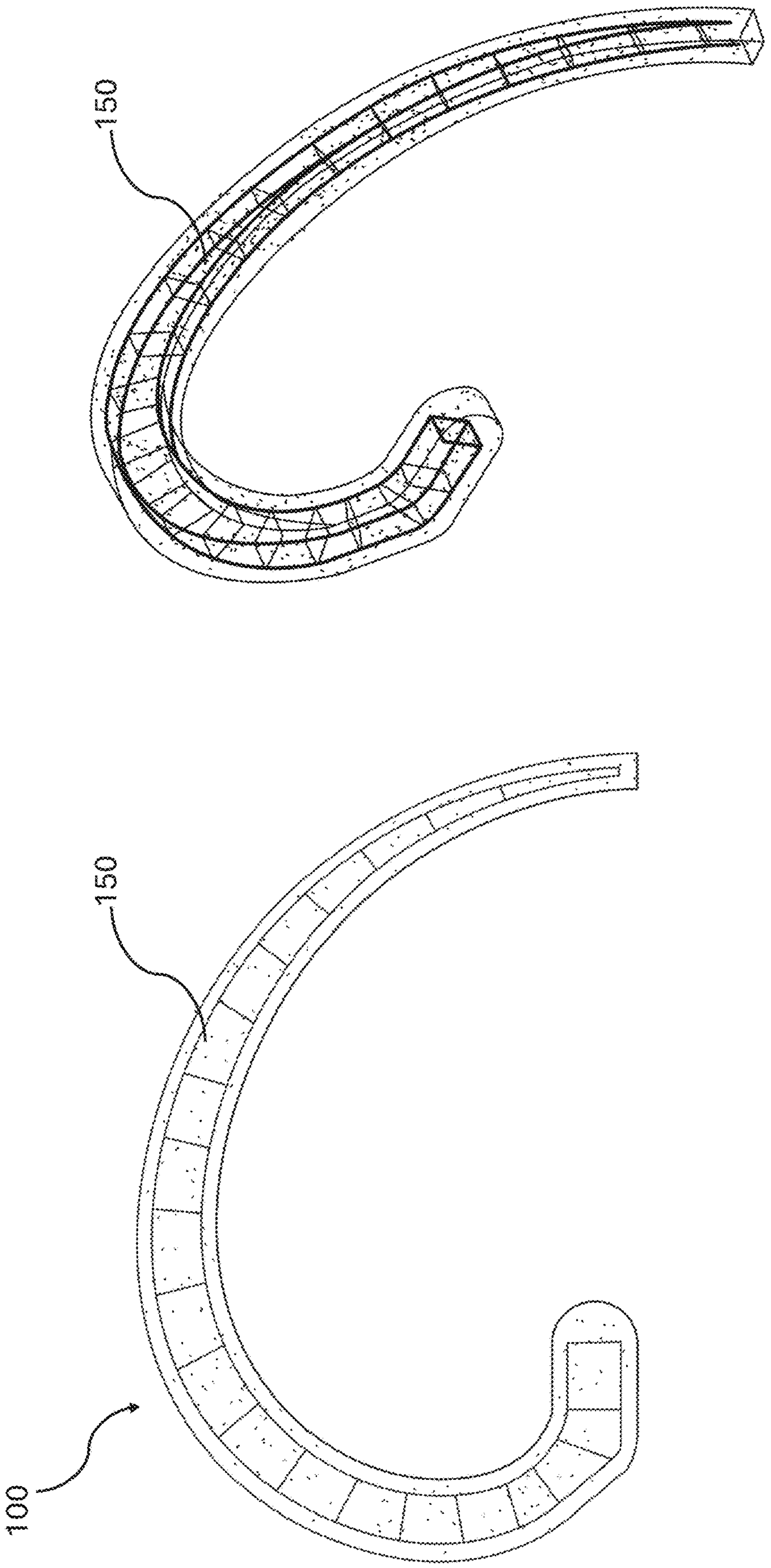
FIG. 3 illustrates a side view and a perspective view of the structure defining a reinforcement, in accordance with an example of the present disclosure.
Figure 5:
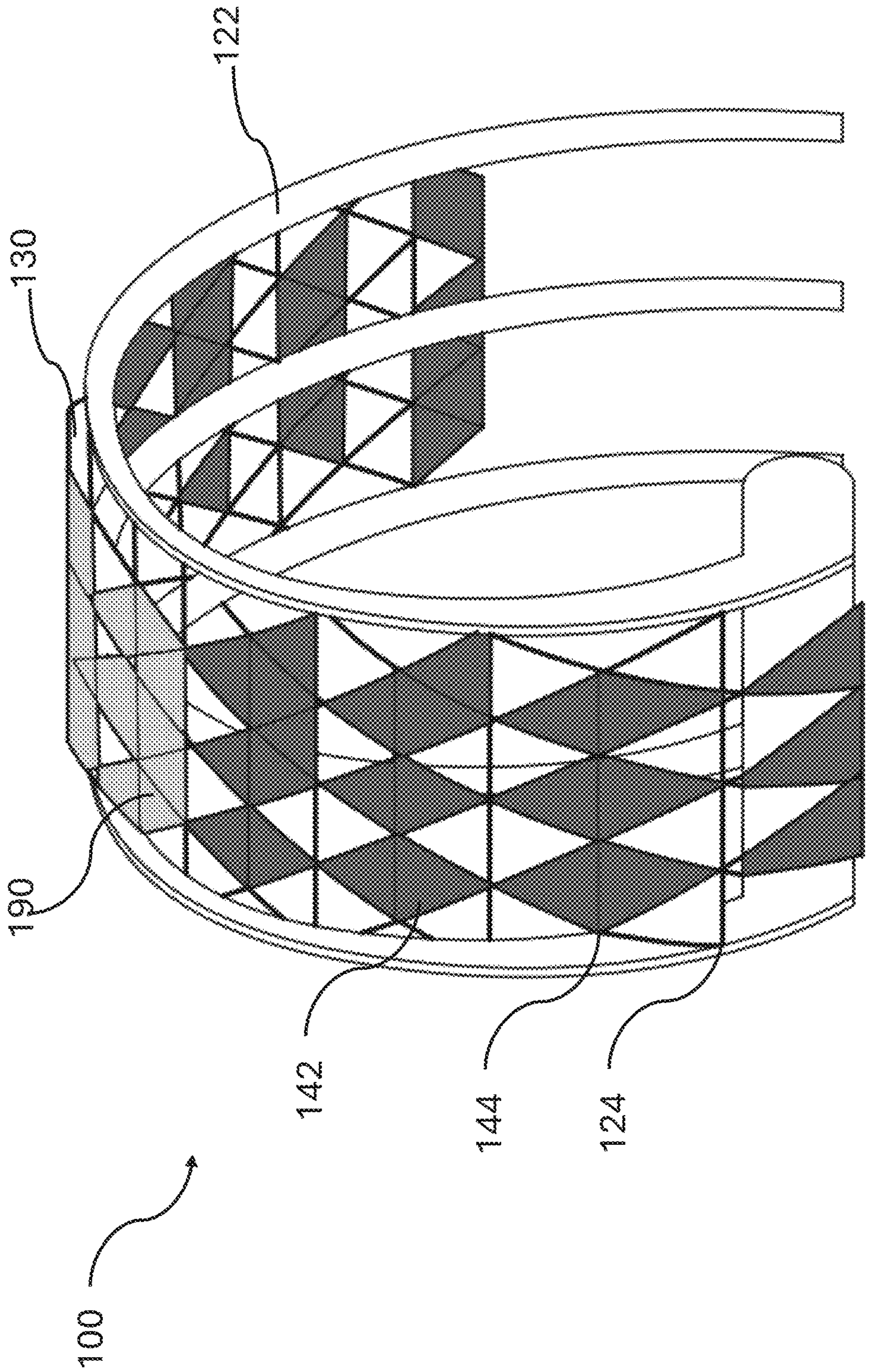
FIG. 5 illustrates the perspective view of the structure supporting a plurality of movable panels, in accordance with an example of the present disclosure.

Referring to FIG. 5, the support frame 120 comprises a plurality of prefabricated mounting recesses 124 that facilitate the attachment of structural elements such as panels, or at least one of a temperature sensor, airflow sensor, and light sensor [not shown in Figures]. Referring to FIG. 3, thickness and density of the support frame 120 are varied along its length during the additive manufacturing process. In one implementation, the thickness and density variation optimize structural integrity while minimizing material usage, ensuring efficient load distribution and reducing overall weight. The plurality of prefabricated mounting recesses 124 are configured to accommodate the plurality of structural elements of the structure 100. In one implementation, the plurality of prefabricated mounting recesses 124 facilitate quick and secure attachment of additional support components, enhancing modularity and adaptability for different architectural settings. In one implementation, the plurality of prefabricated mounting recesses 124 adapted to accommodate the plurality of structural elements without additional drilling or modifications in the structure 100. The structure 100 is adapted to be modular, adaptable to various environmental conditions, and capable of integrating smart control mechanisms for enhanced functionality.

Figure 6:
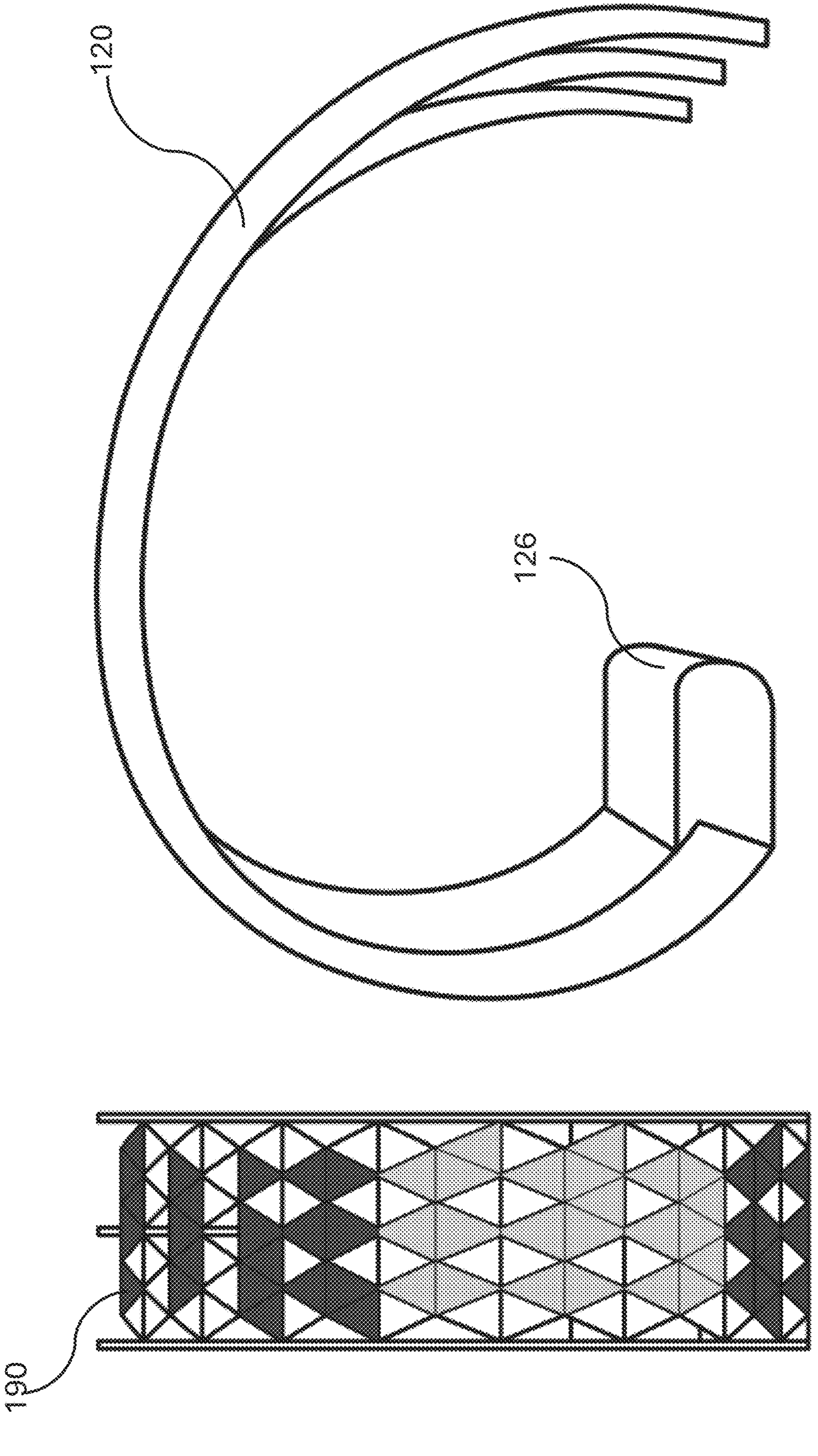
FIG. 6 illustrates the front view and a side view of the structure supporting the plurality of movable panels, in accordance with an example of the present disclosure.

Referring to FIG. 1 along with FIG. 5 and FIG. 6, the structure 100 defines a parametrically configured composite structure incorporating seating areas and a dune-like frame with photovoltaic (PV) panels 190 connected to its upper section. In one implementation, the structure 100 comprises a modular 5-meter extended unit having the arc-shaped elongated body 122 with varying dimensions to achieve the desired aesthetic and functional form. In one implementation, the structure 100 includes the lattice structure 130 comprising a plurality of movable panels 142 thereby allowing airflow, enhancing durability and wind resistance. In one implementation, the plurality of movable panels 142 are photovoltaic (PV) panels 190. In one implementation, a parametric model of the configuration is developed using computational tools, to assess architectural, structural, and fabrication aspects. The configuration prioritizes environmental sustainability and structural stability, optimizing a Universal Thermal Comfort Index (UTCI) to improve outdoor thermal comfort while maximizing the energy efficiency of the plurality of movable panels 142. Through refinements, the average UTCI is reduced from 1° C. to 0.12° C. across various conditions, and panel positioning enhances energy generation, increasing output by 19.5% annually.

In one implementation, the Universal Thermal Comfort Index (UTCI) is used as a key metric to assess the thermal stress experienced by pedestrians in outdoor environments. This index captures the complex physiological behavior of the human body and its thermoregulatory responses to varying outdoor conditions. To account for microclimate effects, a modified version of rural weather data is generated for UTCI calculations.

Referring to FIG. 3, the structure 100 comprises a reinforcement 150 embedded within the arc-shaped elongated body 122 of the support frame 120 during the additive manufacturing process. The reinforcement 150 plays a crucial role in enhancing the mechanical strength, structural integrity, and long-term durability of the structure 100, ensuring it can withstand various mechanical stresses and environmental conditions. The reinforcement 150 comprises at least one of continuous fiber reinforcement, embedded metal components, or composite reinforcement layers, each offering distinct structural benefits, without limiting the scope of the disclosure.

In one implementation, continuous fiber reinforcement (CFR) is integrated within the support frame 120 to significantly improve the tensile strength of the structure 100. In one implementation, the continuous fiber reinforcement selected from a group of carbon, glass, or aramid fibers, placed within the layers of the additively manufactured material to enhance load distribution and resist tensile stresses. The continuous fiber reinforcement allows the structure 100 to maintain flexibility while preventing material deformation or failure under heavy loads.

Additionally, embedded metal components are incorporated within the arc-shaped elongated body 122 to provide localized rigidity and reinforcement in high-stress areas. These metal components may include steel or aluminum inserts that act as internal reinforcements, ensuring that critical load-bearing sections of the structure 100 can support greater forces without compromising stability. The integration of embedded metal components within the additive manufacturing process enhances the overall load-bearing capability and impact resistance of the support frame 120.

Furthermore, composite reinforcement layers are utilized to create a multi-material composition that improves structural performance. These layers may comprises of fiber-reinforced polymer composites or hybrid laminates that enhance resistance to bending, shearing, and improve thermal insulation and structural integrity. The composite reinforcement layers contribute to increased resilience against factors such as thermal expansion, moisture exposure, and mechanical wear, ensuring the long-term reliability of the structure 100.

By integrating continuous fiber reinforcement, embedded metal components, and composite reinforcement layers, the structure 100 achieves an optimal balance of strength, flexibility, and durability. This multi-tiered reinforcement mechanism not only enhances structural performance but also enables efficient material utilization during the additive manufacturing process, leading to a more sustainable and high-performance of the structure 100.

In one implementation, the lattice structure 130 is constructed through the additive manufacturing process and is secured to the support frame 120 through the prefabricated mounting recesses 124. The plurality of movable panels 142 is connected through an interlocking joint mechanism 144 and is adapted to be pivotable or rotatable to regulate environmental inputs, including solar radiation and airflow control. In one implementation, the interlocking joint mechanism 144 enables precise angular adjustments for optimizing shading and ventilation. The adjustability of the lattice structure 130 allows dynamic adaptation to changing environmental conditions, ensuring enhanced thermal comfort and energy efficiency.

In one implementation, the additive manufacturing process employed in constructing the support frame 120 utilizes at least one of gradient density infill technique or a variable layer thickness optimization technique. In one implementation, the gradient density infill technique enables higher density at load-bearing regions while maintaining a lightweight configuration in other areas. This optimization enhances the strength-to-weight ratio and extends the durability of the structure 100, making it resistant to mechanical stresses and environmental conditions.

Additionally, the variable layer thickness optimization technique dynamically adjusts the layer thickness based on structural and geometric requirements. Thicker layers are applied in less complex regions of the support frame 120 to expedite the printing process, while thinner layers are used in areas requiring high precision or intricate detailing. This variation in layer thickness not only improves structural cohesion but also ensures better adhesion between successive layers, enhancing the overall mechanical performance of the structure 100.

By integrating the gradient density infill technique with the variable layer thickness optimization technique, the additive manufacturing process achieves an optimal balance between material efficiency, structural robustness, and fabrication speed. These techniques collectively contribute to the production of a durable and lightweight properties of the structure 100, improving its adaptability to different environmental conditions while reducing material waste and overall fabrication costs.

Figure 7:
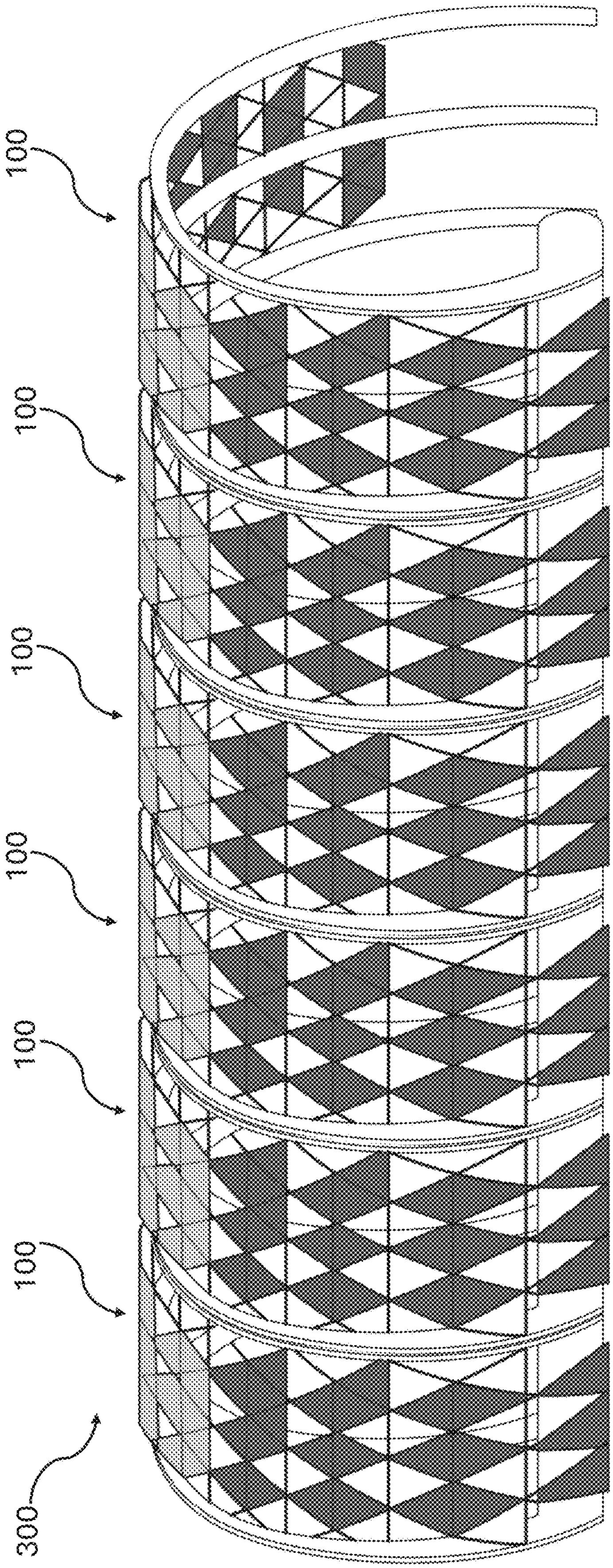
FIG. 7 illustrates a schematic view of a system comprising a plurality of structures, in accordance with an example of the present disclosure.

Referring to FIG. 7, a system 300 for providing shade onto a surface is also disclosed. The system 300 comprises a plurality of structures 100 connectable to each other. One or more of the plurality of structures 100 include the segmented frame 110, the support frame 120, and the lattice structure 130. In one implementation, the segmented frame 110 is adapted for retrofitting onto existing buildings. In one implementation, the segmented frame 110 is configured to be installed onto facades, rooftops, or standalone installations, making it a versatile shading solution.

The plurality of movable panels 142 is connected through the interlocking joint mechanism 144 and is adapted to be pivotable or rotatable to regulate environmental inputs, including solar radiation and airflow control. In one implementation, an automated control system adjusts the panel positions based on weather conditions, optimizing shading, ventilation, and energy efficiency.

Figure 8:
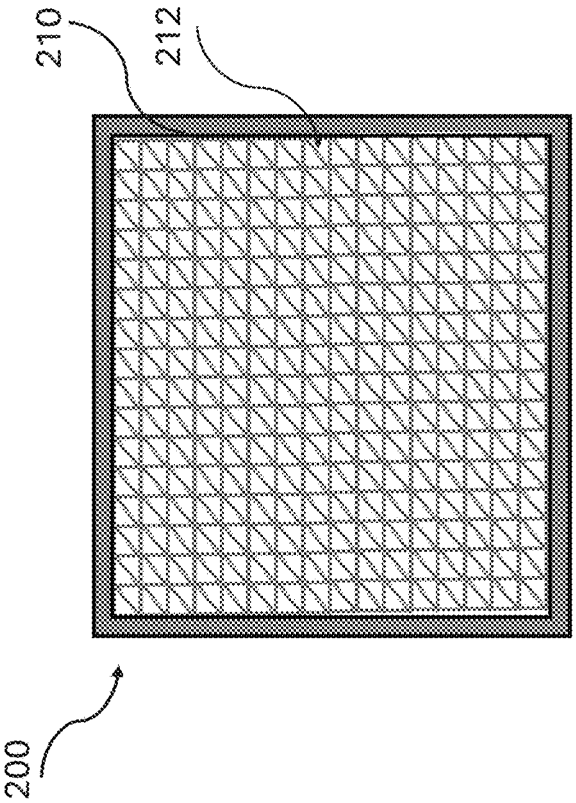
FIGS. 8 (*a*) and 8 (*b*) illustrate a schematic view of a panel structure, in accordance with an example of the present disclosure.
Figure 8:
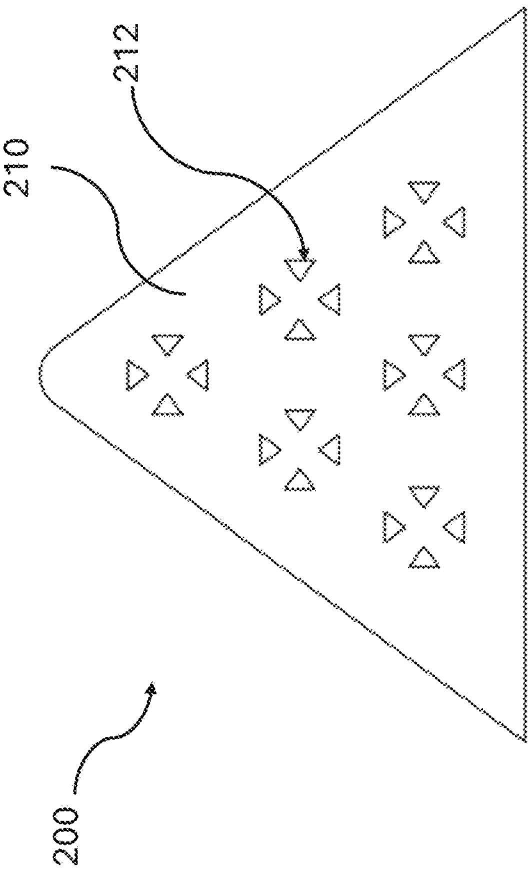

Referring to FIG. 8(*a*) and FIG. 8(*b*), the lattice structure 130 includes a panel structure 200, which is a modular component adapted to enhance natural ventilation through a mashrabiya configuration. The panel structure 200 is engineered to facilitate passive cooling while maintaining aesthetic appeal and structural integrity.

In one implementation, as illustrated in FIG. 8(*a*), the panel structure 200 defines a triangular geometry with a plurality of perforations 210. The plurality of perforations 210 comprises of an array of smaller triangular openings 212, which are computationally optimized to maximize airflow efficiency while ensuring the structural stability of the panel structure 200. The triangular geometry not only enhances ventilation but also contributes to a unique visual identity, making it suitable for modern architectural applications where form and function must be balanced.

Alternatively, as shown in FIG. 8(*b*), the panel structure 200 may be configured in a rectangular geometry, which provides a more traditional and uniform appearance while still incorporating perforations 210 and smaller triangular openings 212 to facilitate airflow. The rectangular configuration offers increased surface coverage, making it ideal for larger facade applications where shading and ventilation need to be controlled over extensive areas.

In one implementation, the structure 100 further includes integrated airflow channels [not shown in Figures] that function in conjunction with the panel structure 200 to enhance passive cooling effects. These channels are configured to create a natural convection cycle, allowing warm air to escape while drawing in cooler air, thereby reducing indoor temperatures and improving overall thermal comfort. This configuration significantly enhances the energy efficiency of buildings by reducing the dependency on artificial cooling systems.

The panel structure 200 is adapted for rapid assembly and disassembly, enabling easy transportation, reconfiguration, and retrofitting onto existing buildings. This modularity allows for scalability and adaptability, making the panel structure 200 suitable for a wide range of architectural applications, from residential and commercial facades to shading devices and privacy screens. The combination of perforations 210 and airflow channels makes the lattice structure 130 both functional and visually appealing. It provides natural ventilation, reduces heat, and saves energy while improving indoor air quality. The panel structure 200 is a practical and sustainable solution for modern buildings.

Figure 9:
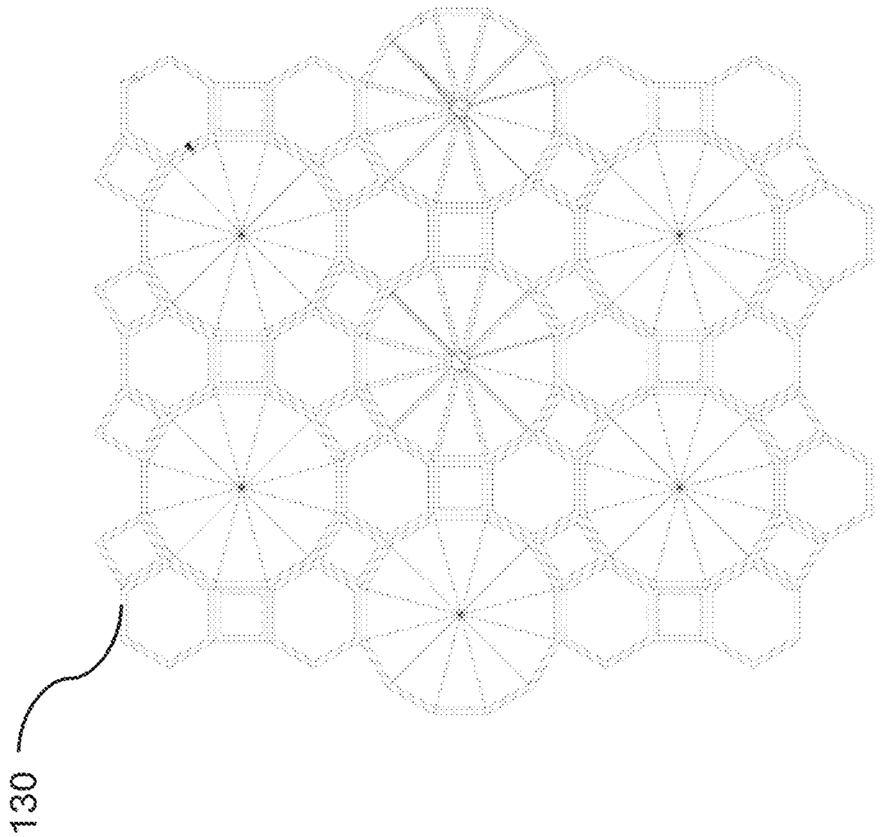
FIGS. 9 (*a*) and 9 (*b*) illustrates a schematic view of the lattice structure supporting photovoltaic panels, in accordance with an example of the present disclosure.
Figure 9:
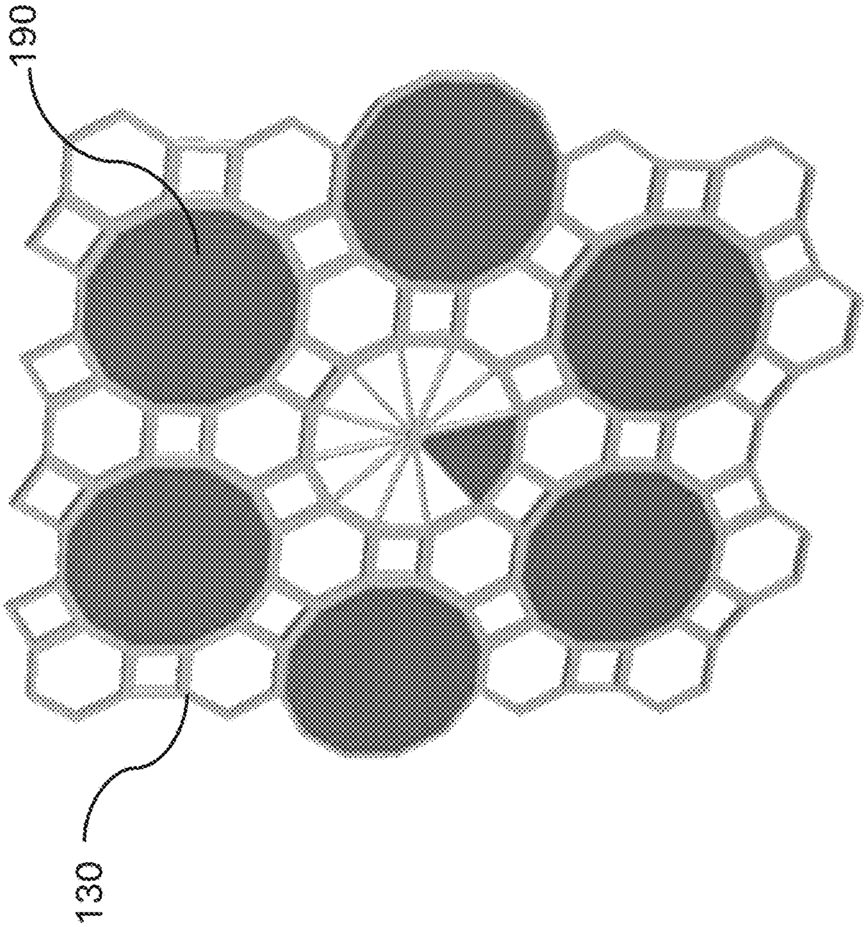
Figure 10A:
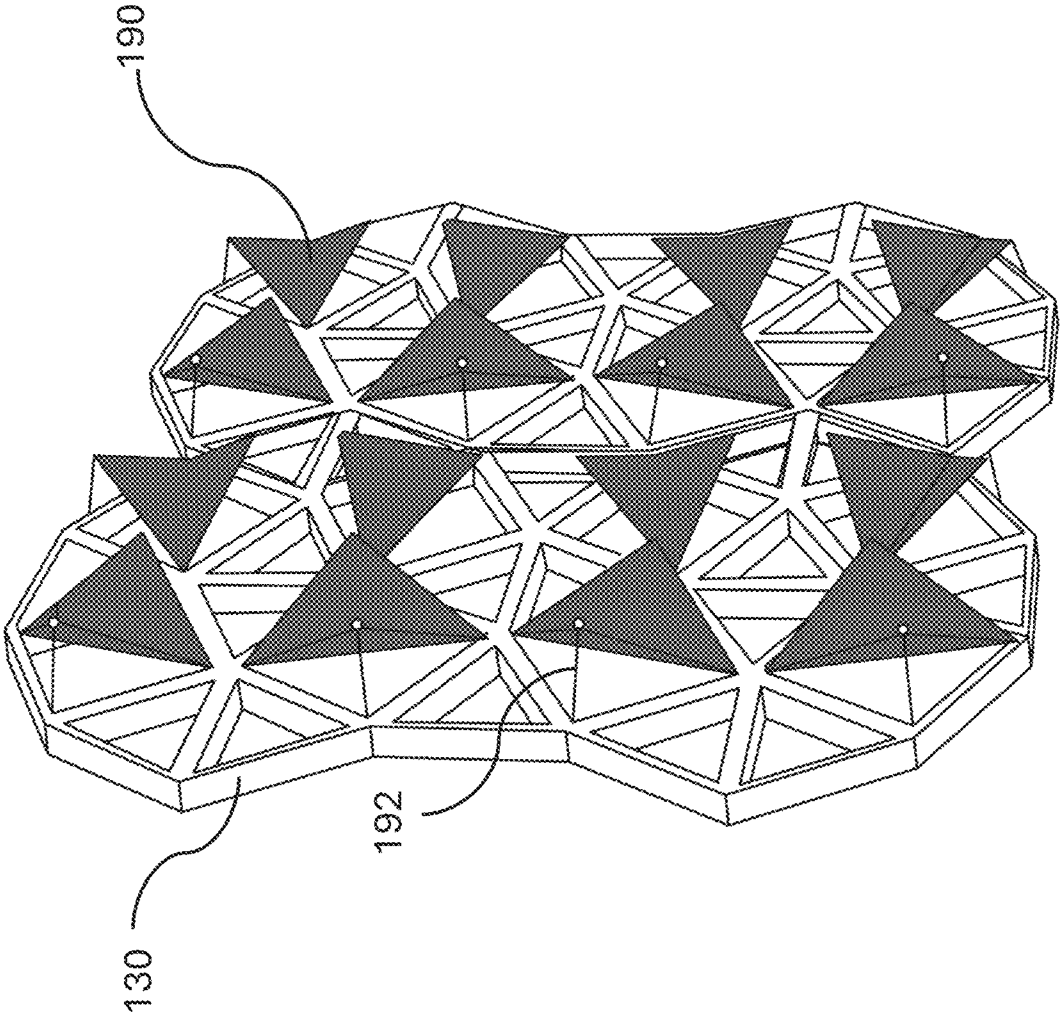
FIGS. 10 (*a*) to 10 (*c*) illustrates schematic views of the lattice structure supporting photovoltaic panels, in accordance with another example of the present disclosure.
Figure 10:
Figure 10:
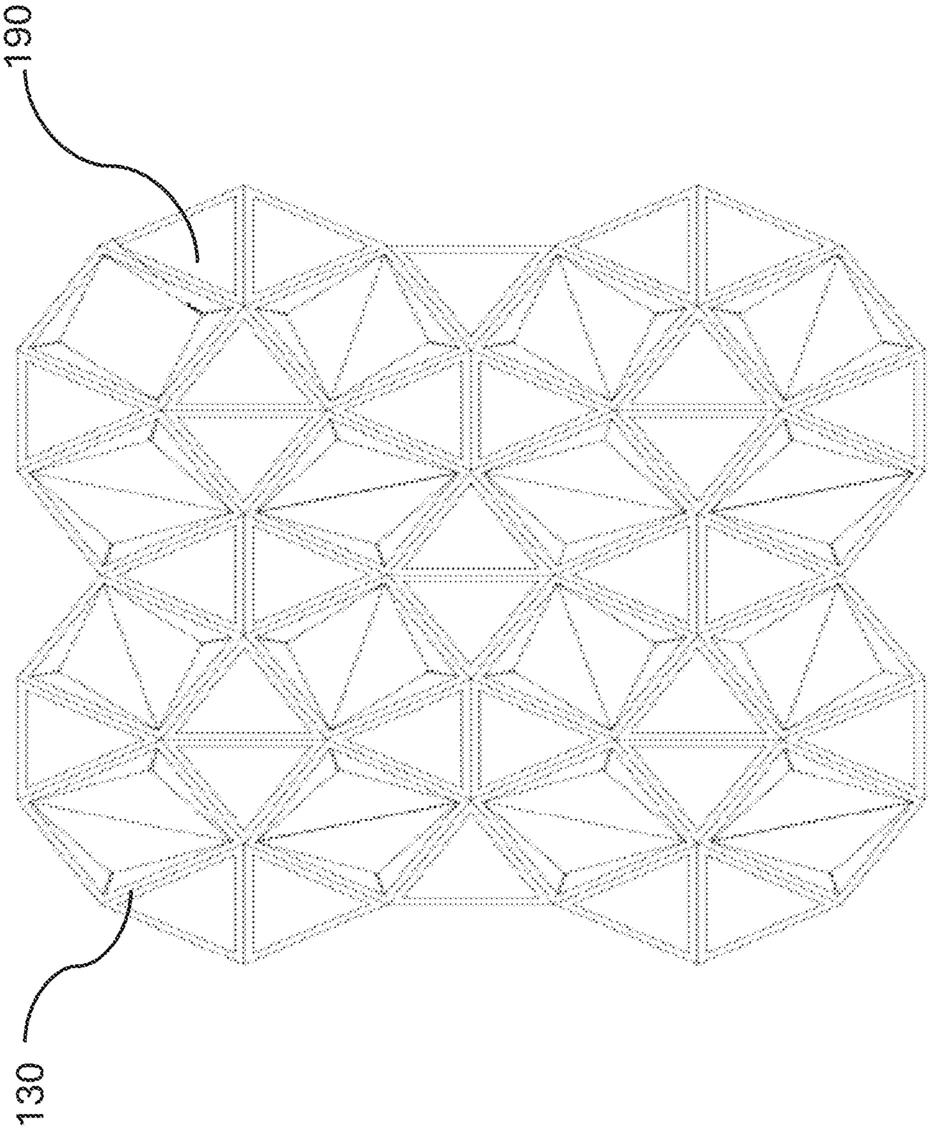

Referring to FIG. 5 along with FIG. 9(*a*)-FIG. 10(*c*), the lattice structure 130 is configured to support and secure at least one photovoltaic panel 190 along with a plurality of actuators 192. The photovoltaic panel 190 is integrated into the upper section of the lattice structure 130, enabling efficient solar energy harvesting while maintaining structural stability. The plurality of actuators 192 is operatively connected to the photovoltaic panel 190 within the lattice structure 130, allowing dynamic control over shading and solar exposure.

In one implementation, the plurality of actuators 192 is controlled by an automated system that continuously monitors and adjusts the orientation of the photovoltaic panel 190 in response to real-time environmental conditions. The plurality of actuators 192 may be driven by electric, hydraulic, or pneumatic mechanisms, depending on the application requirements. In one implementation, the position of the plurality of movable panels 142 is adjusted dynamically to optimize shading throughout the day, reducing heat accumulation beneath the structure 100 while maximizing the photovoltaic panel's 190 energy generation efficiency.

The photovoltaic panel 190 serves a dual function of providing renewable energy while also acting as an integrated component of the structure 100. In one implementation, the photovoltaic panel 190 comprises high-efficiency solar cells arranged in an optimized layout to maximize energy capture. In one implementation, the energy harvested by the photovoltaic panel 190 can be stored in an integrated battery system or directly utilized for powering the actuators 192, thereby creating a self-sustaining system with minimal reliance on external power sources.

Additionally, the plurality of actuators 192 contribute to adaptive shading control by adjusting the angle and position of the movable panels 142 based on solar intensity, wind speed, or temperature variations. This control mechanism improves overall energy efficiency by ensuring that the photovoltaic panel 190 remains in an optimal orientation for maximum power output while simultaneously regulating the amount of shade provided to the underlying surface.

By integrating the photovoltaic panel 190, the plurality of actuators 192, and the plurality of movable panels 142, the lattice structure 130 enhances both functionality and sustainability. This implementation not only reduces energy consumption by leveraging renewable resources but also improves the comfort and usability of the shaded area by adapting to environmental changes in real time.

Referring to FIGS. 9(*a*) and 9(*b*), the lattice structure 130 is configured to support and secure at least one photovoltaic panel 190 in a hexagonal and circular geometric pattern. The lattice structure 130 forms a web-like structure, which is both visually intricate and structurally cohesive. This configuration balances aesthetic appeal with functionality, wherein light can pass through with very high efficiency without any loss in the structural integrity of the lattice structure 130.

FIGS. 9(*a*) and 9(*b*) illustrate a perforated panel configured to move in response to changing environmental conditions. The openness within the hexagonal pattern permits natural light to pass through while acting as shading to reduce direct sunlight, thereby enhancing energy efficiency within the building. This configuration is particularly applicable in modern architecture, where buildings rely heavily on natural lighting and ventilation to maintain indoor comfort. A macro implementation of this pattern on a building facade aids in energy savings by reducing dependence on artificial illumination and cooling applications.

In one implementation, the plurality of photovoltaic panels 190 includes circular rotating fins. The structure is constructed based on an octagonal and circular cell with a metal frame featuring circular fins, which are motor-driven to rotate along an axis. The operation of the panels 190 involves opening and closing in response to changing sunlight intensity, allowing the fins to dynamically regulate airflow and daylight. The visual impact of this configuration enhances the building's aesthetics while offering maximum indoor lighting and cooling flexibility.

Referring to FIGS. 10(*a*) to 10(*c*), the lattice structure 130 is configured to support and secure at least one photovoltaic panel 190 in accordance with another example of the present disclosure. The configuration provides a more detailed lattice pattern with interlocking shapes. The lattice structure 130 defines a fine symmetry and delicate design, balancing ornamentation and functionality, making it both aesthetically appealing and structurally viable for building facades.

The configuration enhances the facade by introducing depth and texture, with smaller perforations compared to the configuration shown in FIGS. 9(*a*) and 9(*b*). Such a denser arrangement provides improved solar control, minimizing solar glare and preventing heat gain while still allowing natural ventilation. The configuration of the lattice structure 130 is particularly suitable for environments prioritizing solar control and privacy. Its finer, denser pattern is ideal for buildings requiring softer, diffused natural light without compromising ventilation, making it a versatile choice for various climate conditions.

Figure 11:
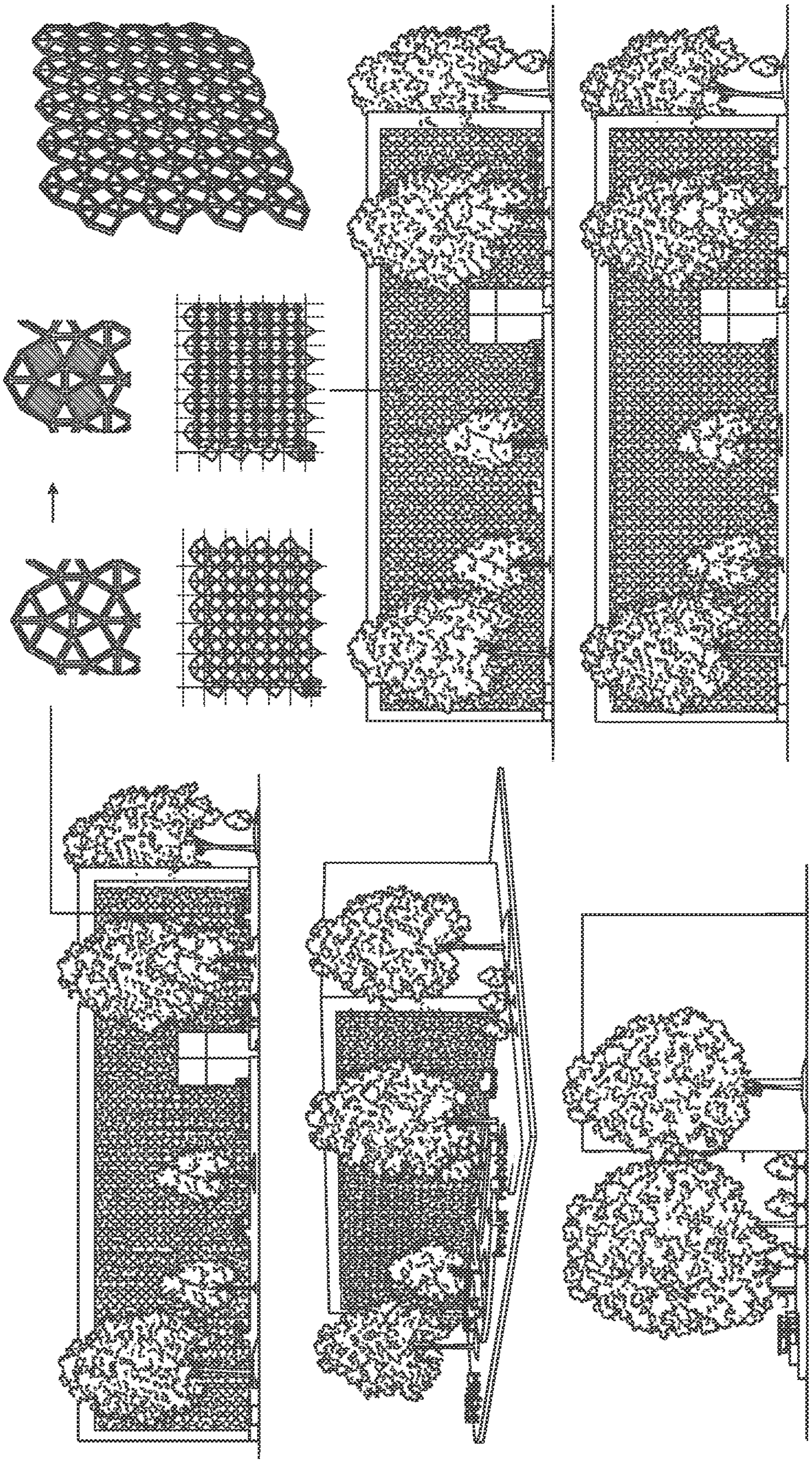
FIG. 11 illustrates actual images of the lattice structure supporting photovoltaic panels to an existing building, in accordance with another example of the present disclosure.

FIG. 11 illustrates actual images of the lattice structure 130, as disclosed in FIGS. 10(*a*) to 10(*c*), implemented on an existing building to support photovoltaic panels 190. The images depict the real-world application of the lattice structure 130, showcasing its ability to integrate seamlessly with the building's facade while enhancing both aesthetic appeal and functional performance.

In this implementation, the lattice structure 130 is securely mounted onto the exterior of the building, demonstrating its capability to provide structural support for the photovoltaic panels 190. The fine, interlocking pattern of the lattice structure 130 allows for optimized solar exposure while mitigating excessive heat gain and glare. Additionally, the smaller perforations in the design facilitate natural ventilation, ensuring thermal comfort within the building while maintaining energy efficiency.

Furthermore, the implementation in FIG. 11 highlights the adaptability of the lattice structure 130 to various architectural styles and environmental conditions. Whether installed on modern or traditional buildings, the design enhances the overall visual appeal while providing functional benefits such as shading, privacy, and energy efficiency. This real-world application validates the effectiveness of the disclosed system in achieving both sustainability and innovative architectural design.

A method for assembling the structure 100 is now disclosed. The method includes providing the support frame 120 that comprises at least one of the arc-shaped elongated body 122 and at least one platform 126. The support frame 120 is constructed through the additive manufacturing process and includes the plurality of prefabricated mounting recesses 124. The lattice structure 130 comprising the plurality of movable panels 142 is secured to the support frame 120 through the prefabricated mounting recesses 124. The thickness and density of the support frame 120 are varied along its length during the additive manufacturing process, optimizing weight distribution and structural efficiency.

The additive manufacturing process employed in the method includes at least one of gradient density infill techniques or variable layer thickness optimization technique. In one implementation, the gradient density infill technique improves material efficiency while ensuring structural performance, reducing material waste and promoting sustainability.

The lattice structure 130 is connected by the fastening mechanism [not shown in Figures] selected from mechanical interlocks, snap-fit connections, or adhesive bonding. In one implementation, mechanical interlocks provide a secure yet detachable connection, while adhesive bonding ensures a permanent attachment.

The structure 100 is constructed from materials selected from UV-resistant polymers, composite materials, or cementitious composites. In one implementation, UV-resistant polymers enhance durability against prolonged exposure to sunlight, while composite materials offer a balance of strength and weight. Cementitious composites provide additional structural robustness, making the structure 100 suitable for long-term outdoor use.

In one implementation, a specific model section is selected for additive manufacturing after finalizing the design configuration. In one implementation, the prototype included seven parts, comprising of three arc-shaped elongated body 122 and four platforms 126. The configuration is segmented in the plurality of modular segments 110*a*, 110*b*, 110*c* to simplify construction and streamline the manufacturing process. The arc-shaped elongated body 122 and the platforms 126 are manufactured horizontally offsite and later transported to the installation site.

In one implementation, the arc-shaped elongated body 122 is manufactured using a cement-based mixture made of Ordinary Portland cement, sand, and water. No accelerators were used in the mixture. The same mixture is used for all structural components to maintain consistency. In one implementation, steel rebars are used for the reinforcement 150 during the manufacturing process. A load analysis determined the rebar placement. The rebars were bent and arranged to match the arc's curvature. Referring to FIG. 2, uniform gaps were maintained between layers to ensure full encapsulation within a concrete matrix. This process improved structural integrity and durability of the structure 100.

Figure 4:
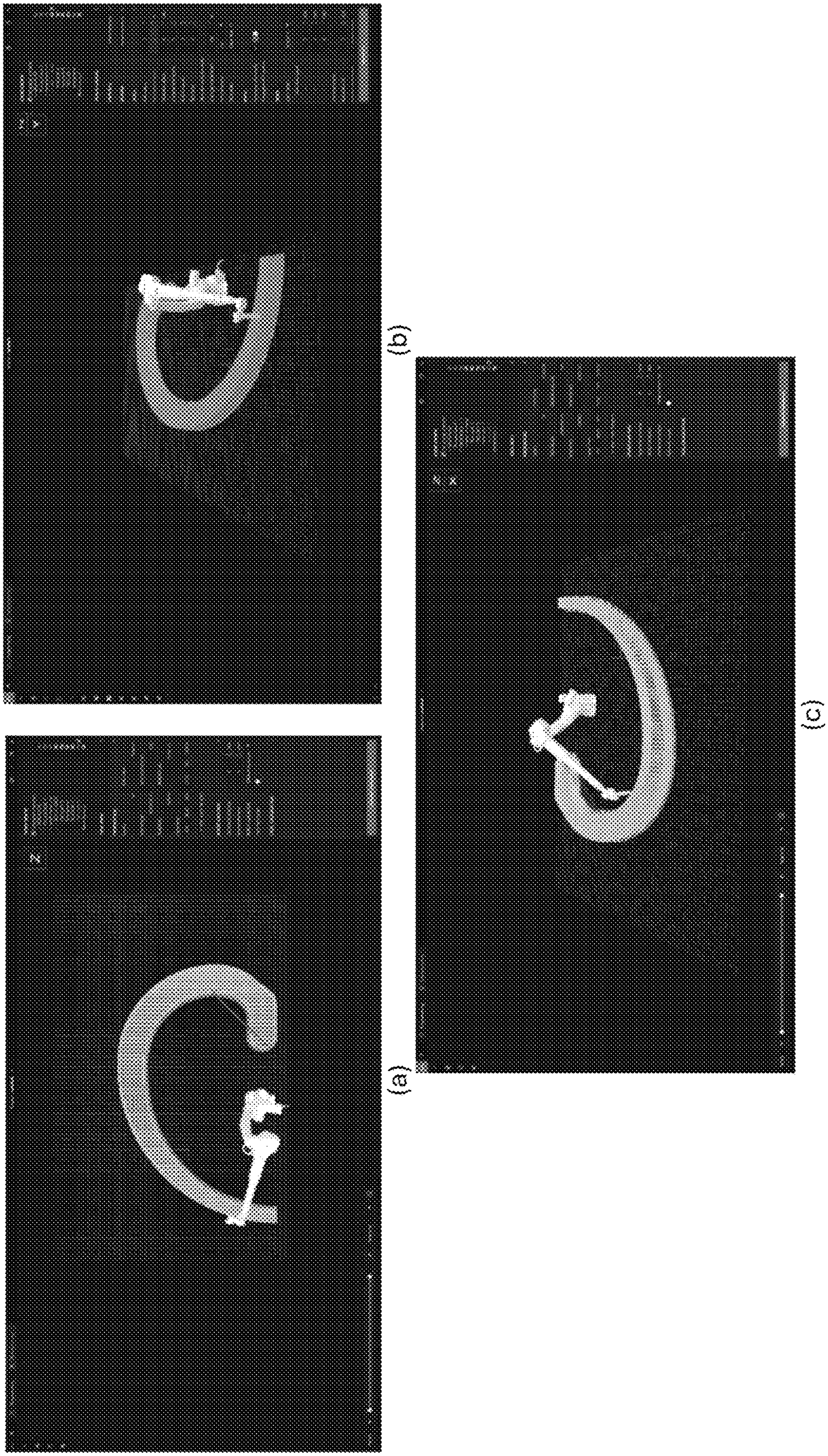
FIG. 4 illustrates screenshots of a slicing process using Adaxis software during additive manufacturing process, in accordance with an example of the present disclosure.

In one implementation, the lattice structure 130 is integrated at the top of the structure 100 to support the plurality of movable panels 142. In one implementation, the lattice structure 130 is made of reinforced concrete and marine plywood panels. The plywood panels were CNC-machined from recycled palm tree wood and painted to improve durability and aesthetics. In one implementation, the digital fabrication process used Rhino software to create the model. The model is exported as a .3dm file and processed in Adaxis software. Referring to FIG. 4, the Adaxis software performed slicing, path planning, and program generation. The final file is saved in KRL format and uploaded to KUKA Orange Edit, the robot's programming interface. The program controlled the manufacturing process. This workflow ensured accurate coordination between digital modeling and automated construction.

The support frame 120 is constructed by a hybrid material extrusion process selected from fused deposition modeling (FDM), stereolithography (SLA), or concrete extrusion. In one implementation, fused deposition modeling (FDM) allows for precise layering of thermoplastic materials, while concrete extrusion enables large-scale structural fabrication. A hydrophobic or UV-resistant coating is applied to the support frame 120 to enhance durability. In one implementation, the coating reduces water absorption and extends the lifespan of the structure 100, improving resistance to weathering and environmental degradation.

In one implementation, a layered extrusion method is used for concrete deposition in the additive manufacturing process. Each layer is extruded continuously without interruptions between successive layers. This method is applied sequentially to fabricate both arc-shaped elongated body 122 and the platform 126, following distinct tool paths for each component. Ensuring structural integrity, the process does not require supplementary materials or chemical agents for inter-layer adhesion. Instead, reinforcement 150 is incorporated concurrently with the printing process.

In one implementation, the fabrication time for the arc-shaped elongated body 122 ranges from 36 to 48 hours, while the platform 126 requires 12 to 24 hours. The printing parameters are optimized to include an extrusion velocity of 100 mm/s, a nozzle diameter of 30 mm, a 100% infill density, and a layer height between 15 and 20 mm. After printing, each component undergoes a hydration process lasting 10 to 15 minutes, followed by a six-day curing process.

Figure 12A:
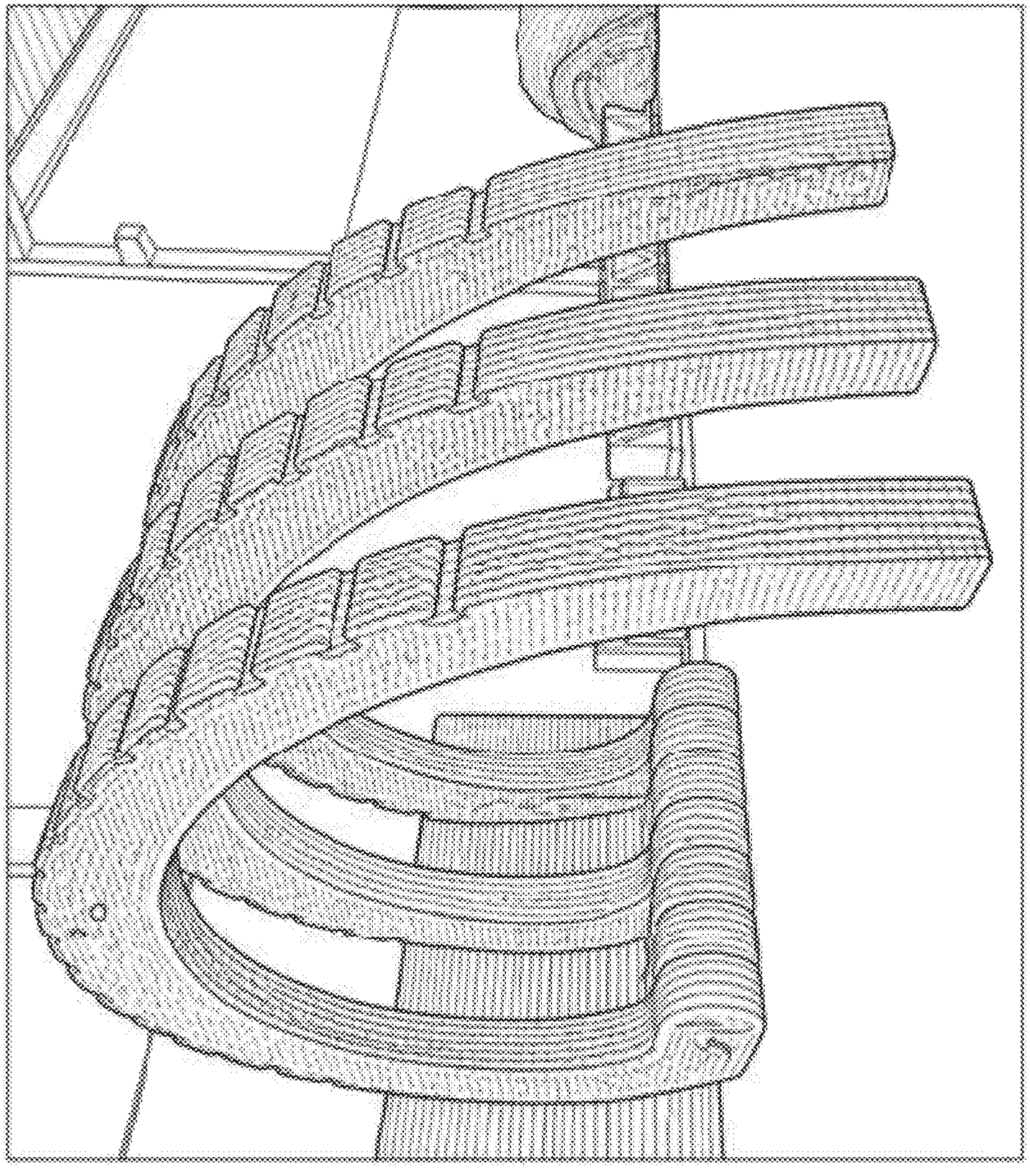
FIG. 12(*a*)-(*c*) illustrates actual images of the structure comprising the support frame and the lattice structure, in accordance with an example of the present disclosure.
Figure 12B:
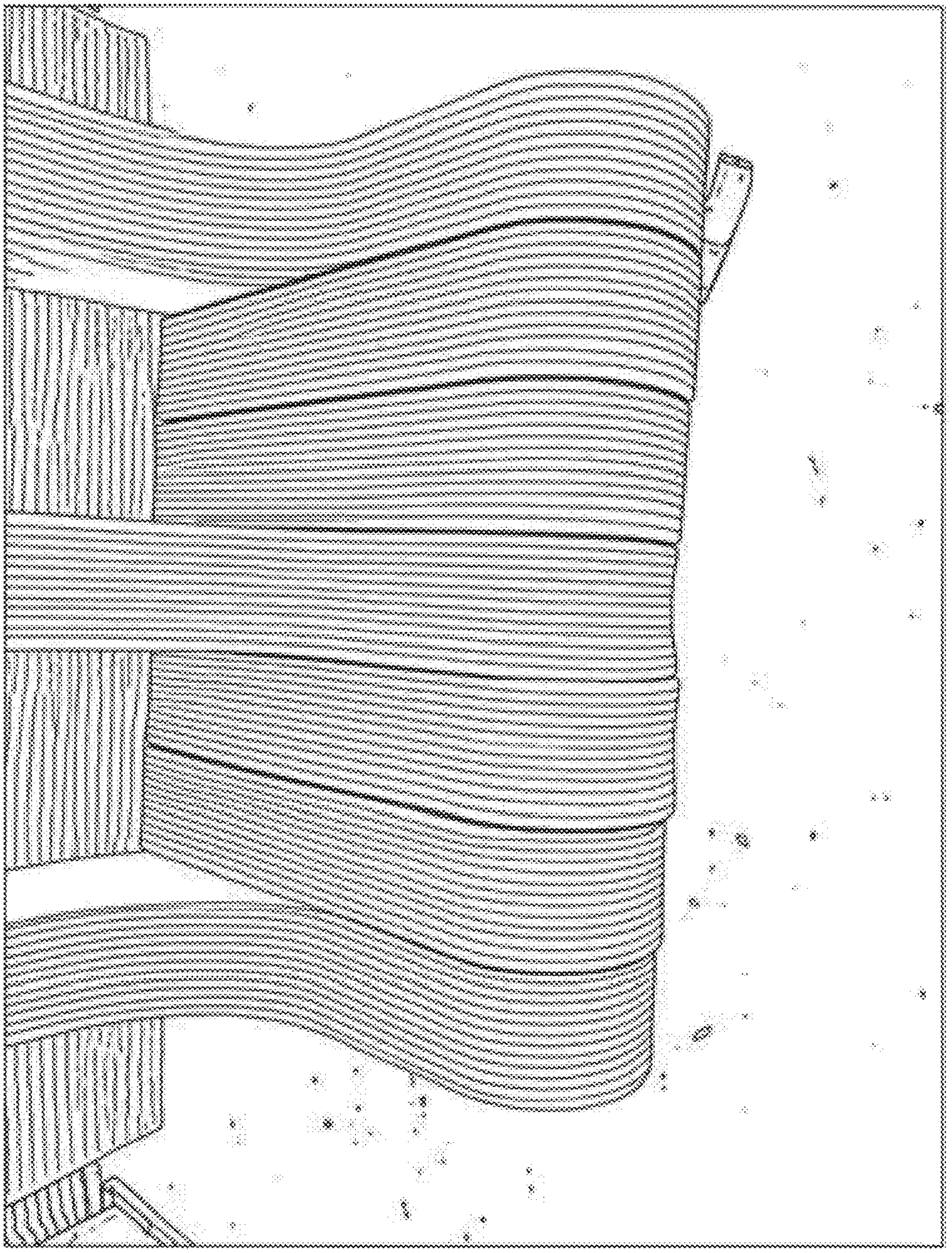
Figure 12C:
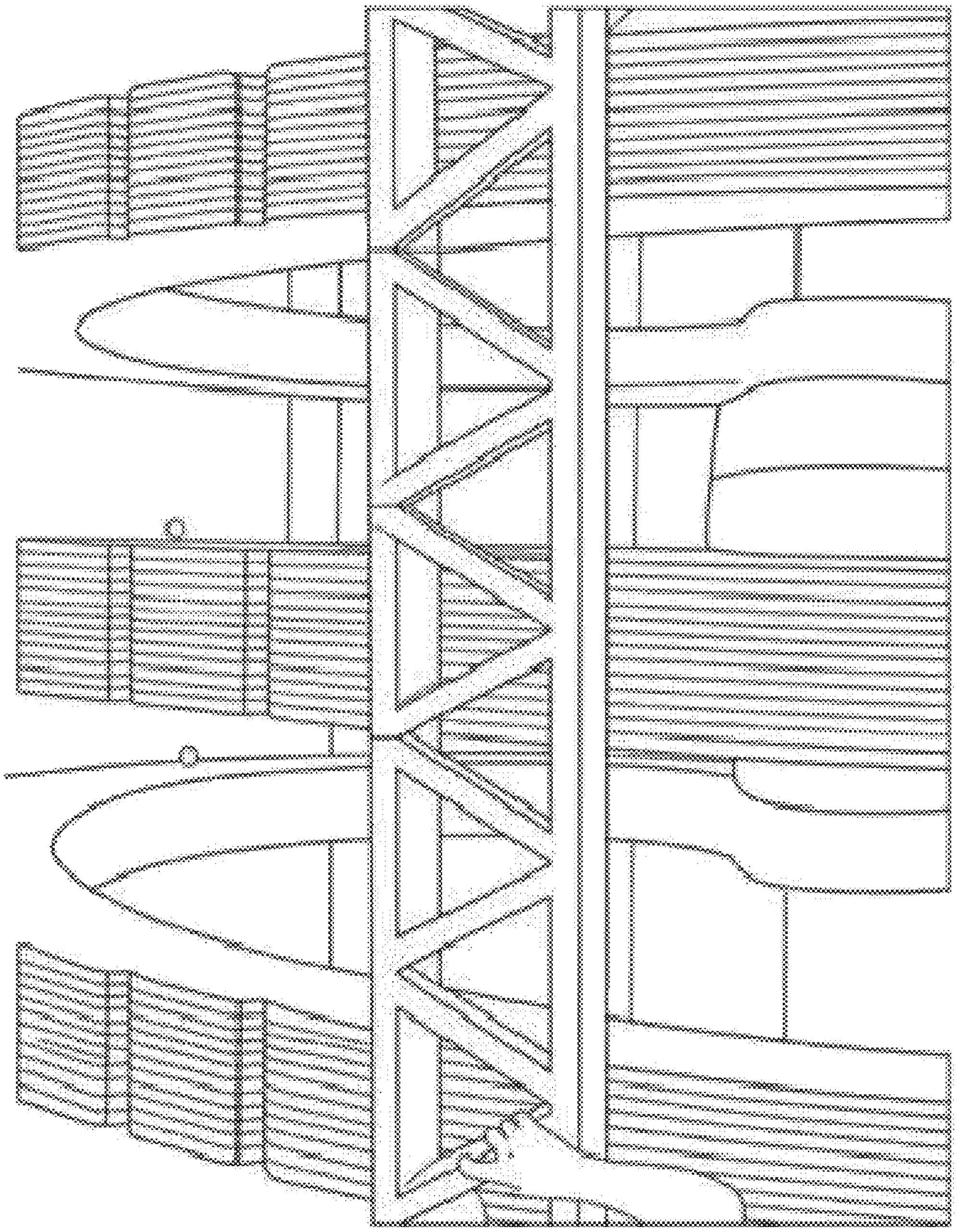

Referring to FIGS. 12(*a*) to 12(*c*), that illustrate actual images of the structure 100 including the arc-shaped elongated body 122, the platform 126, and the lattice structure 130, which is completed within approximately ten working days. The structure 100 incorporates advanced additive manufacturing techniques to achieve precision in design, efficiency in construction, and enhanced functional properties.

As shown in FIGS. 12(*a*) to 12(*c*), the exterior of the structure 100 is defined by a texture-enhanced surface, wherein the layers of the additive manufacturing process create a self-cleaning, dust-resistant exterior. This characteristic significantly reduces maintenance requirements, making the structure 100 highly suitable for deployment in harsh environmental conditions where frequent cleaning is impractical.

In one implementation, the additive manufacturing process employs a robotic arm-controlled extrusion system, enabling precise layer-by-layer deposition of concrete or composite materials. This process ensures accuracy in curvature formation and optimizes the load-bearing capacity of the structure 100. Furthermore, a plurality of nozzle configurations may be used during the construction phase to simultaneously deposit reinforcement fibers, conductive elements, or insulation layers, thereby enhancing the overall structural integrity and multifunctionality of the printed elements.

The additive manufacturing process utilizes a cementitious mixture infused with nano-silica or polymeric additives to further improve the mechanical and environmental performance of the structure 100. This composition enhances mechanical strength, water resistance, and thermal insulation, ensuring durability across varying climatic conditions. Additionally, the real-time monitoring system integrated within the additive manufacturing process continuously adjusts flow rate, nozzle speed, and layer adhesion properties based on environmental conditions and material viscosity, thereby optimizing print quality and structural consistency.

In one implementation, the printing material comprises geopolymer concrete, offering enhanced fire resistance and significantly lower $CO_2$ emissions compared to conventional cement-based materials. Alternatively, the printing material may include a hybrid mixture of cement and recycled aggregates, reinforcing sustainability and reducing construction waste. Additionally, phase-change materials (PCMs) may be embedded within the printed layers to facilitate passive thermal regulation, thereby improving the overall energy efficiency of the structure 100.

A real-time structural health monitoring sensors are embedded within the structure 100, allowing for continuous tracking of material stress, deformation, and environmental exposure. In one implementation, embedded piezoelectric elements are incorporated within the structure 100, enabling energy generation from wind-induced vibrations, thus contributing to sustainable energy solutions.

Furthermore, in one implementation, selectively integrated glass panels within the structure 100 provide dynamic light transmission control, optimizing shading and thermal comfort while enhancing the aesthetic appeal of the overall design. The seamless integration of these advanced construction methodologies and smart material innovations ensures that the structure 100 is not only architecturally sophisticated but also energy-efficient, sustainable, and adaptable to various environmental conditions.

In one implementation, an advanced approach to large-scale additive manufacturing is used for architectural applications. Simultaneous reinforcement and printing techniques are implemented to address structural stability challenges in additively manufactured concrete elements. The extended fabrication timeline requires careful consideration of layer adhesion and overall structural cohesion. This process highlights the complexities of fabricating large-scale architectural structures and emphasizes the importance of advanced planning and precise execution. Maintaining consistent material properties and structural integrity throughout the fabrication period is crucial.

The present disclosure provides the structure 100 that is modular, adaptable, and environmentally responsive and offers numerous advantages in terms of functionality, sustainability, and structural integrity. The segmented frame 110 allows for scalability and customization, enabling configurations that accommodate various spatial constraints and applications. The use of mechanical fasteners 112 facilitates rapid assembly and disassembly, enhancing flexibility in deployment. The structure 100 incorporates an advanced additive manufacturing process that optimizes material efficiency by employing gradient density infill and variable layer thickness technique, ensuring high strength-to-weight ratios while minimizing material waste.

The support frame 120, constructed with the plurality of prefabricated mounting recesses 124, allows seamless integration of structural elements without additional drilling or modifications, increasing adaptability and reducing installation time. The incorporation of reinforcement 150 such as continuous fiber reinforcement, embedded metal components, and composite reinforcement layers enhances mechanical strength, structural integrity, and long-term durability, allowing the structure to withstand mechanical stresses and environmental conditions. Additionally, the lattice structure 130 includes the plurality of movable panels 142 that optimize solar energy harvesting while providing adaptive shading and airflow control, contributing to improved outdoor thermal comfort and energy efficiency.

The parametric design, developed using computational tools, enables precise control over shading, ventilation, and solar exposure, improving the Universal Thermal Comfort Index (UTCI) while increasing photovoltaic energy generation by 19.5% annually. The use of sustainable materials, including UV-resistant polymers, composite materials, and cementitious composites, enhances durability and weather resistance, making the structure suitable for long-term outdoor use. The structure 100 having segmented configuration simplifies transportation and onsite assembly, reducing logistical challenges. Furthermore, the system 300 allows the plurality of structures 100 to be interconnected, forming a network of shading solutions adaptable to various architectural settings, including facades, rooftops, and standalone installations. The combination of modularity, sustainability, structural resilience, and smart control mechanisms makes the present disclosure a highly efficient and adaptable shading solution suitable for diverse environmental conditions and applications.

It should be imperative that the structure 100, the system 300, the method and any other elements described in the above description should not be considered as a limitation with respect to the figures. Rather, variations to such structures, systems and methods should be considered within the scope of the description.

The invention claimed is:

1. A structure for providing shade onto a surface, the structure comprising:

a segmented frame comprising a plurality of modular segments being configured to be connected to form the structure, the plurality of modular segments comprising:

a support frame comprising at least one of an arc-shaped elongated body and at least one of a platform, the support frame being constructed through an additive manufacturing process, the support frame comprising a plurality of prefabricated mounting recesses; and a lattice structure comprising a plurality of movable panels, the lattice structure being supported and secured to the support frame through the plurality of prefabricated mounting recesses;

wherein thickness and density of the support frame being varied along the length of the support frame during the additive manufacturing process.

2. The structure according to claim 1, wherein the additive manufacturing process employs at least one of gradient density infill technique or a variable layer thickness optimization technique.

3. The structure according to claim 1, wherein the plurality of modular segments are connected by mechanical fasteners.

4. The structure according to claim 1, comprises a reinforcement embedded within the arc-shaped elongated body of the support frame during the additive manufacturing process.

5. The structure according to claim 1, wherein the plurality of movable panels is connected through an interlocking joint mechanism and is adapted to be pivotable or rotatable to regulate environmental inputs including solar radiation and airflow control.

6. The structure according to claim 1, wherein the reinforcement comprises at least one of:

i. continuous fiber reinforcement, ii. embedded metal components, or iii. composite reinforcement layers.

7. The structure according to claim 1, wherein the structure is constructed through a material selected from UV-resistant polymers, composite materials, or cementitious composites.

8. The structure according to claim 1, wherein the plurality of movable panels includes at least one photovoltaic panel.

9. The structure according to claim 1 comprises a plurality of actuators operatively connected to the plurality of movable panels within the lattice structure.

10. The structure according to claim 1, wherein the prefabricated mounting recesses are configured to accommodate a plurality of structural elements of the structure.

11. A method for assembling a structure for providing shade onto a surface, the method comprising:

providing a support frame comprising at least one of an arc-shaped elongated body and at least one of a platform, the support frame being constructed through an additive manufacturing process, the support frame comprising a plurality of prefabricated mounting recesses, wherein thickness and density of the support frame being varied along the length of the support frame during the additive manufacturing process; and securing a lattice structure comprising a plurality of movable panels to the support frame through prefabricated mounting recesses to form the structure.

12. The method according to claim 11, wherein the additive manufacturing process employs at least one of gradient density infill technique or a variable layer thickness optimization technique.

13. The method according to claim 11, wherein the support frame is constructed by a hybrid material extrusion process selected from fused deposition modeling (FDM), stereolithography (SLA), or concrete extrusion.

14. The method according to claim 11, comprising applying a hydrophobic or UV-resistant coating to the support frame.

15. The method according to claim 11, wherein the lattice structure is connected by a fastening mechanism selected from mechanical interlocks, snap-fit connections, or adhesive bonding.

16. A system for providing shade onto a surface, the system comprising:

a plurality of structures connectable to each other, wherein one or more of the plurality of structures comprising:

a segmented frame comprising a plurality of modular segments being configured to be connected to form the structure, the plurality of modular segments comprising:

a support frame comprising at least one of an arc-shaped elongated body and at least one of a platform, the support frame being constructed through an additive manufacturing process, the support frame comprising a plurality of prefabricated mounting recesses;

a lattice structure comprising a plurality of movable panels, the lattice structure being supported and secured to the support frame through the plurality of prefabricated mounting recesses;

wherein thickness and density of the support frame being varied along the length of the support frame during the additive manufacturing process.

17. The system according to claim 16, wherein the additive manufacturing process employs at least one of gradient density infill technique or a variable layer thickness optimization technique.

18. The system according to claim 16, wherein the segmented frame is adapted for retrofitting onto existing buildings.

19. The system according to claim 16, wherein the plurality of movable panels is connected through an interlocking joint mechanism and is adapted to be pivotable or rotatable to regulate the environmental inputs including solar radiation and airflow control.

* * * * *